(12) United States Patent
Frankel et al.

(10) Patent No.: US 8,241,549 B2
(45) Date of Patent: Aug. 14, 2012

(54) FLUORINATED ELASTOMERIC GAS DIFFUSER MEMBRANE

(76) Inventors: Thomas E. Frankel, Poughkeepsie, NY (US); Seoungil Kang, Poughkeepsie, NY (US); Todd D. Ritter, Poughkeepsie, NY (US)

( * ) Notice: Subject to any disclaimer, the term of this patent is extended or adjusted under 35 U.S.C. 154(b) by 1017 days.

(21) Appl. No.: 12/221,809

(22) Filed: Aug. 7, 2008

(65) Prior Publication Data

US 2010/0032851 A1    Feb. 11, 2010

(51) Int. Cl.
*C08J 5/00* (2006.01)
(52) U.S. Cl. ......... 264/331.14; 210/500.22; 210/500.27; 210/500.37; 96/6; 261/122.1; 521/27; 264/241; 264/331.13; 264/DIG. 70
(58) Field of Classification Search ............... 261/122.1; 210/500.21, 500.22, 500.27, 500.37, 650, 210/651; 521/27; 264/241, 331.13, 331.14, 264/DIG. 70
See application file for complete search history.

(56) References Cited

U.S. PATENT DOCUMENTS

| | | | | |
|---|---|---|---|---|
| 2,697,623 A * | 12/1954 | Mosher | | 277/573 |
| 3,977,606 A * | 8/1976 | Wyss | | 239/145 |
| 4,047,908 A * | 9/1977 | Steigelmann et al. | | 96/5 |
| 4,414,280 A * | 11/1983 | Silva et al. | | 428/422 |
| 4,491,653 A | 1/1985 | McGinniss et al. | | |
| 4,657,564 A * | 4/1987 | Langsam | | 95/51 |
| 4,759,776 A * | 7/1988 | Langsam et al. | | 95/51 |
| 4,869,859 A | 9/1989 | Eschwey et al. | | |
| 4,952,220 A * | 8/1990 | Langsam et al. | | 96/13 |
| 5,112,941 A * | 5/1992 | Kasai et al. | | 528/353 |
| 5,410,925 A * | 5/1995 | Mueller | | 83/30 |
| 5,445,739 A | 8/1995 | Fujimoto et al. | | |
| 5,657,891 A * | 8/1997 | Bilani et al. | | 220/367.1 |
| 5,753,014 A * | 5/1998 | Van Rijn | | 96/12 |
| 5,922,468 A * | 7/1999 | Huesmann et al. | | 428/422 |
| 6,048,607 A * | 4/2000 | Hashimoto et al. | | 428/315.5 |
| 7,674,514 B2 * | 3/2010 | Frankel et al. | | 428/131 |
| 7,677,398 B2 * | 3/2010 | Belfer et al. | | 210/500.38 |
| 2002/0033334 A1 * | 3/2002 | Tschuncky et al. | | 204/415 |
| 2003/0134515 A1 * | 7/2003 | David et al. | | 438/694 |
| 2003/0203183 A1 * | 10/2003 | Hester et al. | | 428/315.5 |
| 2004/0028875 A1 * | 2/2004 | Van Rijn et al. | | 428/98 |
| 2005/0003204 A1 | 1/2005 | Frankel et al. | | |
| 2006/0000777 A1 * | 1/2006 | Da Costa et al. | | 210/640 |
| 2007/0001323 A1 | 1/2007 | Kang | | |
| 2007/0128394 A1 | 6/2007 | Frankel et al. | | |
| 2011/0198763 A1 * | 8/2011 | Frankel et al. | | 261/122.1 |

\* cited by examiner

*Primary Examiner* — Duane Smith
*Assistant Examiner* — Christopher P Jones
(74) *Attorney, Agent, or Firm* — Law Offices of Michael L. Wise, LLC

(57) ABSTRACT

The present invention relates generally to a structure for a diffused aeration system. More particularly, the invention encompasses a diffuser membrane where at least a portion of the surface has been treated with at least one layer of fluorine, to form a fluorinated elastomeric gas diffuser membrane. The invention also includes the deposition of fluorine atoms on the surface of a non-fluorine containing membrane to create a permanent fluoro-elastomeric surface layer. Tubular and disc diffuser members are also disclosed that have at least a portion of them treated with at least one layer of fluorine. A process of making the inventive diffuser membrane is also disclosed.

7 Claims, 3 Drawing Sheets

FLUORINATED ELASTOMERIC GAS DIFFUSER MEMBRANE

FIELD OF THE INVENTION

The present invention relates generally to a structure for a diffused aeration system. More particularly, the invention encompasses a diffuser membrane where at least a portion of the surface has been treated with at least one layer of fluorine, to form a fluorinated elastomeric gas diffuser membrane. The invention also includes the deposition of fluorine atoms on the surface of a non-fluorine containing membrane to create a permanent fluoro-elastomeric surface layer. Tubular and disc diffuser members are also disclosed that have at least a portion of them treated with at least one layer of fluorine. A process of making the inventive diffuser membrane is also disclosed.

BACKGROUND INFORMATION

In sewage treatment plants and industrial wastewater treatment plants the most common method of providing mass transfer of oxygen to the process is through diffused aeration with flexible membrane diffusers.

Such diffusers are typically manufactured of a plastic housing and can have either an EPDM (Ethylene Propylene Diene Monomer) membrane or a silicone rubber membrane. These membranes are typically perforated with numerous small slits or holes or openings. The completed diffusers having the membrane are then attached to a piping system containing compressed air and installed, typically, at the bottom of a tank, with the compressed air providing the air flow as needed. The small slits or openings or perforations vibrate open and close continuously as air passes through them, creating fine bubbles. When the compressed air is shut off, the slits seal, and the membrane is pressed against the plastic holder, and functions like a check valve preventing water from entering the air piping system.

Conventional membranes made out of materials like EPDM work well in a large number of treatment plants, however, it has been discovered that they can clog-up or be attacked, such as, from most solvents, fats, oils, greases, acids, bases, to name a few.

U.S. Pat. No. 4,491,653 (Vincent C. McGinniss, et al.) the disclosure of which is incorporated herein by reference, discloses a method for fluorinating the surface of a polymeric solid for improving a surface property of such solid while substantially maintaining the bulk physical properties of said solid. This method comprises contacting the polymeric solid with dilute fluorine gas at a temperature not substantially above about room temperature and at a pressure not substantially above about 1 atmosphere for a time adequate to partially fluorinate said solid surface by forming stable fluorocarbon groups wherein the ratio of —$CF_2$— groups to —CHF— groups is not substantially above about 1:1, the proportion of oxygen-providing groups pre-send during said fluorination being restricted to an amount whereby substantially no oxidation of said surface occurs.

U.S. Pat. No. 4,869,859 (Manfred Eschwey, et al.) the disclosure of which is incorporated herein by reference, discloses a process for blow molding and fluorination of a hollow thermoplastic article includes bringing a blank to rest against the inside wall of the blow mold as a result of introducing an inert blow gas. An inert gas/reaction mixture is then introduced in the hollow article for fluorinating the inside surface of the hollow article. After the inside surface of the hollow article has cooled off, the inert gas/reaction gas mixture is blown in below the melting point of the thermoplastic material.

U.S. Patent Publication No. 2005/0003204 (Thomas E. Frankel, et al.), the disclosure of which is incorporated herein by reference, discloses a multi-layer article includes a fluoropolymer layer and a substrate which are joined permanently through a multi-step cross-linking technique. Also, disclosed is a multi-layer membrane with a molded fluoro-elastomeric surface layer.

U.S. Patent Publication No. 2007/0001323 (Seoungil Kang), the disclosure of which is incorporated herein by reference, discloses a multi-layered membrane of disk-typed and tube-typed membrane air diffuser. The system is installed in the aeration tank of the sewage and waste water treatment system that is used to turn the air, which was supplied from the blower, into a fine bubble spray so that the oxygen in the air can be efficiently dissolved into the sewage and waste water. By doing it, this system analyzes and removes the biochemical oxygen demand and suspended solids biologically, and enables to be appropriately mixed so that the sedimentation within the aeration tank can be prevented. Also, disclosed is a multi-layer membrane with a coated fluoro-elastomeric surface layer.

U.S. Patent Publication No. 2007/0128394 (Thomas E. Frankel, et al.), the disclosure of which is incorporated herein by reference, discloses a multi-layer membrane which includes a fluorine containing layer and a substrate which are joined through spray coating and heat treatment in a multi-step technique. Also, disclosed is a multi-layer membrane with a coated fluoro-elastomeric surface layer.

Furthermore, most molded elastomeric membranes of any material have a rough surface when viewed under a microscope. This roughness of the surface allows foulants in the wastewater, such as, calcium carbonate, to deposit and collect on the surface. Such deposits can significantly impair the efficiency of the diffuser.

It has also been discovered that solvents that are used to apply the coating on these diffuser membranes also create issues relating to the use of these coatings in wastewater applications, such as, membrane coatings containing solvents have been known to dissolve over time where like solvents are present in the wastewater.

It has also been observed that membranes of the prior art do not protect against inner-slit fouling by foulant materials, such as, for example, calcium carbonate.

Even with these improvements, and known problems of the prior art, a need exists for an improved gas membrane diffuser.

Thus, a need exists for an improved diffused aeration system.

A need also exists for a diffuser membrane where the surface has been treated with at least one layer of fluorine.

The invention provides a diffuser membrane where the surface has been treated with at least one layer of fluorine.

PURPOSES AND SUMMARY OF THE INVENTION

The invention is a novel method and structure for a diffuser membrane where the surface of the membrane has been treated with at least one layer of fluorine.

Therefore, one purpose of this invention is to provide a novel diffuser membrane where the surface of the membrane has been treated with at least one layer of fluorine.

Another purpose of this invention is to provide a diffuser membrane where the surface openings in the membrane have been treated with at least one layer of fluorine.

Yet another purpose of this invention is to have a diffuser membrane which is coated with at least one layer of fluorine be used in a sewage treatment plant or industrial wastewater treatment plant environment.

Still yet another purpose of this invention is to deposit at least one layer of fluorine atoms on the surface of a non-fluorine containing elastomeric membrane to create a permanent and durable fluoro-elastomeric surface layer.

Yet another purpose of this invention is to protect against inner-slit fouling by foulant materials by coating the sidewalls of the inner-slits with at least one coating of a fluorinated material.

Therefore, in one aspect this invention comprises a gas diffuser membrane, comprising:
(a) at least one diffuser membrane layer, wherein said diffuser membrane layer has a first surface and a second surface; and
(b) at least one first fluorinated layer in contact with at least a portion of said first surface of said at least one diffuser membrane layer, and at least one second fluorinated layer in contact with at least a portion of said second surface of said at least one diffuser membrane layer, such that said at least one diffuser membrane layer is between said at least one first fluorinated layer and said at least one second fluorinated layer, and thereby forming said gas diffuser membrane.

In another aspect this invention comprises a gas diffuser membrane, comprising:
(a) at least one diffuser membrane layer; and
(b) at least one fluorinated layer, and wherein said fluorinated layer is in physical contact with at least a portion of said at least one diffuser membrane layer, and thereby forming said gas diffuser membrane.

In yet another aspect this invention comprises a gas diffuser membrane, comprising:
(a) at least one diffuser membrane layer, wherein said diffuser membrane layer has a first surface and a second surface;
(b) at least one fluorinated layer in physical contact with at least a portion of said first surface of said diffuser membrane layer; and
(c) at least one PTFE layer in physical contact with at least a portion of said second surface of said diffuser membrane layer, such that said at least one diffuser membrane layer is between said at least one fluorinated layer and said at least one PTFE layer, and thereby forming said gas diffuser membrane.

BRIEF DESCRIPTION OF THE DRAWINGS

The features of the invention that are novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

DETAILED DESCRIPTION

The present invention applies to diffuser membranes made of non-flourine containing elastomers which are treated with fluorine gas. It has been discovered that elastomers, known as, fluoro-elastomers, are impervious to attack from most solvents, fats, oils, greases, acids, and bases, to name a few. It has been found that an advantage of fluorine gas treating a non-fluorinated elastomer is to create a fluorine atom containing barrier layer which is significantly more resistant than the base material to fats, oils, greases, solvents, acids and bases, and at a reasonable cost and rapid rate of production.

Another advantage of the present invention is the addition of inner-slit protection. In some wastewaters, particularly in the dairy, pulp and paper, and landfill industries, it is possible to find calcium carbonate fouling inside the slits. In wastewater processes where air is cycled on and off, such as the sequencing batch reactor, it is also possible to find inner-slit fouling. By treating the elastomeric membrane with fluorine gas under vacuum, fluorine will enter and treat the microscopic passageway at the slit where the elastomer on both sides of the slit appear to the naked eye to be in contact with each other.

The treated membrane of this invention is protected not only on the top water surface, as disclosed in U.S. Patent Application Publication No. 20070001323 (Seoungil Kang), and U.S. Patent Application Publication No. 20070128394 (Thomas E. Frankel, et al.), and in the slit openings, but also on the bottom of the membrane which is in contact with compressed air from the blowers. This air may contain acids which are intentionally entrained and vaporized to periodically clean the membranes and pipes. It may also contain ozone from the blower room if it lacks proper ventilation. However, it has been discovered that by surface fluorinating the bottom air side of the membrane, an additional prophylactic protection is provided.

In accordance with a preferred embodiment of the invention, a special process is used to manufacture the membrane. An elastomer formed of EPDM (Ethylene Propylene Diene Monomer), NBR (Nitrile Butadiene Rubber), blended elastomers, fabric or similar other material is produced and perforated by knives, lasers or other methods well known in the art. For some applications the membranes may be placed in a vacuum chamber containing fluorine gas to form at least one layer of fluorine coating.

Figure 1:
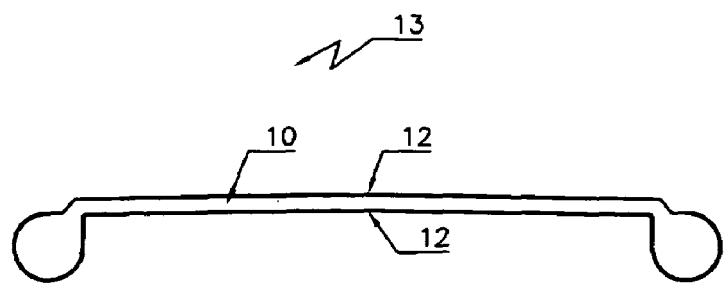
FIG. 1 is an exemplary diffuser membrane which is used to illustrate a first embodiment of the present invention.

FIG. 1 is an exemplary diffuser membrane 13, which is used to illustrate a first embodiment of the present invention. An EPDM (Ethylene Propylene Diene Monomer) layer 10, is coated with at least one layer of fluorine to form a fluorinated layer 12. The EPDM layer 10, can be made by methods well known in the art, such as, for example disclosed in U.S. Patent Application Publication No. 20070001323 (Seoungil Kang), U.S. Patent Application Publication No. 20070128394 (Thomas E. Frankel, et al.), to name a few. The fluorinated layer 12, can be formed, such as by dipping or inserting the EPDM layer 10, in a bath containing fluorine and allowing the formation of at least one fluorinated layer 12, over the EPDM layer 10. Another way of forming the fluorinated layer 12, would be to place the EPDM layer 10, in an environmentally controlled chamber and introducing fluorine gas and allowing the formation of at least one fluorinated layer 12, around the EPDM layer 10.

Figure 2:
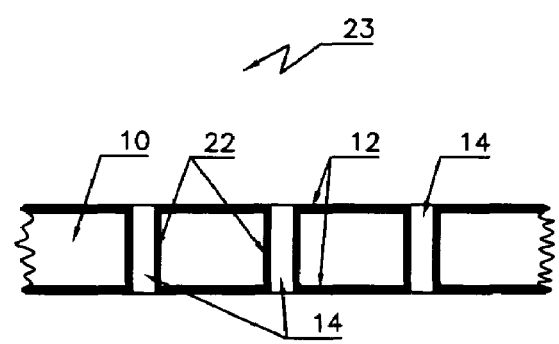
FIG. 2 is an exemplary diffuser membrane which is used to illustrate a second embodiment of the present invention.

FIG. 2 is an exemplary diffuser membrane 23, which is used to illustrate a second embodiment of the present invention. The diffuser membrane 23, comprises an EPDM layer 10, that has a plurality of perforations or openings or holes or slits 14, where the inner side walls within the opening 14, have a coating of at least one fluorinated sidewall layer or material 22, while the upper surface and the lower surface of the EPDM layer 10, has at least one coating of the fluorinated layer 12. The method of forming the fluorinated layer 12 or fluorinated sidewall layer 22, could be the same as discussed with reference to FIG. 1. Thus, with this invention one protects against the inner-slit fouling by foulant materials by coating the sidewalls of the inner-slits 14, with at least one coating of the fluorinated material 22.

Figure 3:
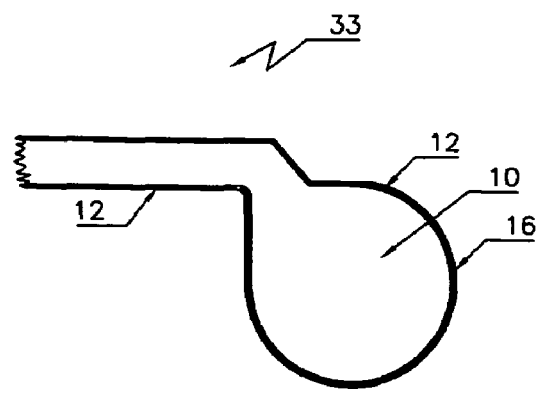
FIG. 3 is an exemplary diffuser membrane which is used to illustrate a third embodiment of the present invention.

FIG. 3 is an exemplary diffuser membrane 33, which is used to illustrate a third embodiment of the present invention. The diffuser membrane 33, comprises a typical EPDM layer 10, as is well known in the prior art. The EPDM layer 10, has an O-ring shaped structure 16, around the periphery. The EPDM layer 10, having the O-ring shaped structure 16, are coated with at least one layer of fluorinated layer 12. It should be understood that the diffuser membrane 33, could have a plurality of openings 14, as illustrated in FIG. 2, and having the side wall of the opening 14, coated with at least one layer of the fluorinated layer 22, as shown in FIG. 2.

Figure 4:
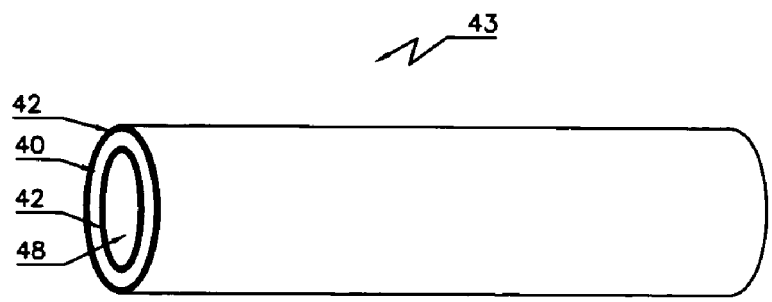
FIG. 4 is an exemplary diffuser membrane which is used to illustrate a fourth embodiment of the present invention.

FIG. 4 is an exemplary diffuser membrane 43, which is used to illustrate a fourth embodiment of the present invention. The diffuser membrane 43, has a tubular EPDM layer 40, having an tubular opening 48. The diffuser membrane 43, is coated with at least one layer of fluorine to form a fluorinated layer 42, such that the fluorinated layer 42, covers all the previously exposed surfaces of the tubular EPDM layer 40. The tubular EPDM layer 40, can be made by methods well known in the art, such as, for example disclosed in U.S. Patent Application Publication No. 20070001323 (Seoungil Kang), U.S. Patent Application Publication No. 20070128394 (Thomas E. Frankel, et al.), to name a few. The fluorinated layer 42, can be formed, such as by dipping or inserting the tubular EPDM layer 40, in a bath containing fluorine and allowing the formation of at least one fluorinated layer 42, over the tubular EPDM layer 40. Another way of forming the fluorinated layer 42, would be to place the tubular EPDM layer 40, in an environmentally controlled chamber and introducing fluorine gas and allowing the formation of at least one fluorinated layer 42, over the tubular EPDM layer 40.

Figure 5:
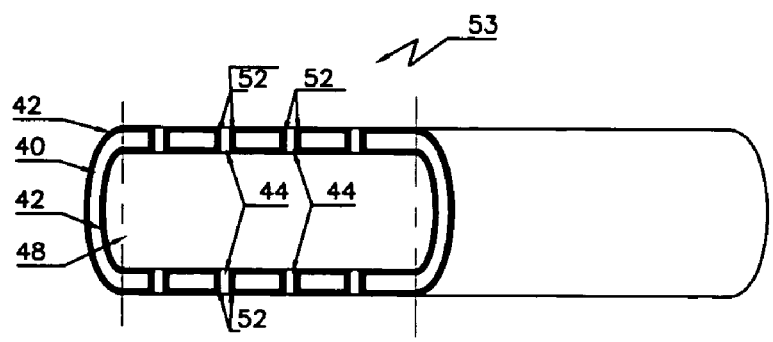
FIG. 5 is an exemplary diffuser membrane which is used to illustrate a fifth embodiment of the present invention.

FIG. 5 is an exemplary diffuser membrane 53, which is used to illustrate a fifth embodiment of the present invention. The diffuser membrane 53, comprises a tubular EPDM layer 40, that has a plurality of openings or holes or slits 44, where the inner side walls within the opening 44, have a coating of at least one fluorinated sidewall layer 52, while the outer and inner surface of the tubular EPDM layer 40, has at least one coating of the fluorinated layer 42. The method of forming the fluorinated layer 42, or fluorinated sidewall layer 52, could be the same as discussed with reference to FIG. 4.

Figure 6:
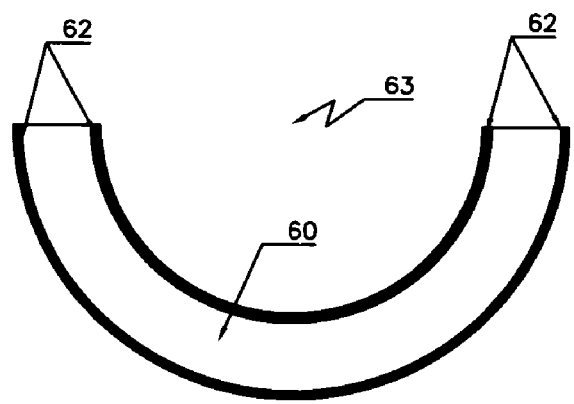
FIG. 6 is an exemplary diffuser membrane which is used to illustrate a sixth embodiment of the present invention.

FIG. 6 is an exemplary diffuser membrane 63, which is used to illustrate a sixth embodiment of the present invention. An EPDM (Ethylene Propylene Diene Monomer) layer 60, is coated with at least one layer of fluorine to form a fluorinated layer 62. The EPDM layer 60, is in a shape of a "sock" 60, or a bow-shaped membrane 60, or a bowl-shaped membrane 60, or a flat-membrane 60, that has elasticity to change into a spherical-shape under pressure. It should be understood that the diffuser membrane could have openings or slits (not shown) similar to the slits or openings or holes 14 and 44.

Figure 7:
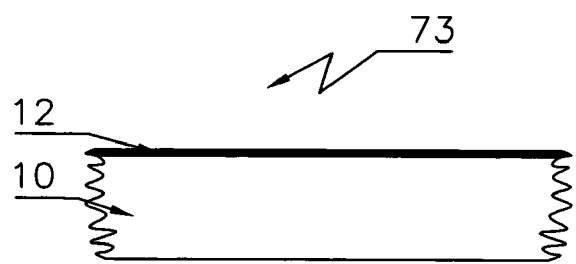
FIG. 7 is an exemplary diffuser membrane which is used to illustrate a seventh embodiment of the present invention.

FIG. 7 is an exemplary diffuser membrane 73, which is used to illustrate a seventh embodiment of the present invention. At least one EPDM (Ethylene Propylene Diene Monomer) layer 10, is coated with at least one layer of fluorine to form a fluorinated layer 12. Thus for some applications it may be desirable to have a plain EPDM membrane or layer 10, and a single fluorinated layer 12, on either the upper surface or the lower surface of the EPDM layer 10. It should also be understood that for some applications the diffuser membrane 73, could have a plurality of perforations or holes or openings or slits 14 or 44.

Figure 8:
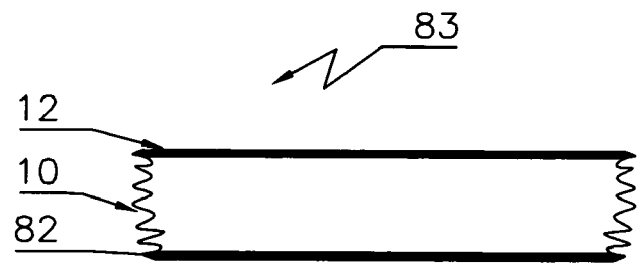
FIG. 8 is an exemplary diffuser membrane which is used to illustrate an eighth embodiment of the present invention.

FIG. 8 is an exemplary diffuser membrane 83, which is used to illustrate an eighth embodiment of the present invention. At least one EPDM (Ethylene Propylene Diene Monomer) layer 10, is coated with at least one layer of fluorine to form a fluorinated layer 12. The EPDM layer 10, is then coated with at least one layer of a PTFE (polytetrafluoroethylene) coating 82. Thus for some applications it may be desirable to have a plain EPDM membrane or layer 10, and a single fluorinated layer 12, on either the upper surface or the lower surface of the EPDM layer 10, and a single PTFE layer 82, on the opposite side of the fluorinated layer 12. It is however preferred that the EPDM membrane 10, has the inner layer that is the fluorinated layer 12, and that the outer layer be the PTFE layer 82. It should also be understood that for some applications the diffuser membrane 83, could have a plurality of perforations or holes or openings or slits 14 or 44.

For most applications the gas diffuser membrane has a plurality of perforations or openings or slits 14 or 44, and wherein the slits 14 or 44, have a diameter of between about 0.1 mm to about 8.0 mm, and preferably between about 0.5 mm to about 4.0 mm, and more preferably about 1.0 mm.

The diffuser membrane layer 10 or 40 or 60, could be selected from a group consisting of an elastomeric material, an EPDM (ethylene-propylene-diene monomer) material, a NBR (Nitrile Butadiene Rubber) material, a polyurethane material, and a combination thereof, to name a few.

However, for some applications the diffuser membrane layer 10 or 40 or 60, could be selected from a group consisting of a non-fluorine containing membrane, a non-fluorinated polymer, a composite, a metal, and a combination thereof, to name a few. The non-fluorinated polymer could be selected from a group consisting of nitrite rubbers, EPDM (ethylene-propylene-diene monomer) rubbers, epichlorohydrin rubbers, ethylene-acrylate copolymer rubbers, polyamides, polyurethanes, polyolefins, a thermoplastic polymer, a thermoplastic elastomer, and combinations thereof, to name a few.

The gas diffuser membrane 13, 23, 33, 43, 53 or 63, is preferably a fine bubble diffuser membrane or a coarse bubble diffuser membrane.

For some applications the gas diffuser membrane 10 or 40 or 60, could comprise a monomer segment derived from an olefinic hydrocarbon.

It should be appreciated that all exposed surfaces inside the openings or holes or slits 14 or 44 are protected from the elements with a coating or covering of at least one fluorinated layer 22 or 52, such as, fluorinated sidewall layer 22 or 52.

The surface or the shape of the gas diffuser membrane 13, 23, 33, 43, 53 or 63, is selected from a group consisting of a flat surface, a tubular surface, a curved surface, a polygonal-shaped surface, a disc-shaped surface, a sock-shaped surface, and combinations thereof, to name a few.

The gas diffuser membrane 13, 23, 33, 63, of this invention can be made by a number of methods, for example, one method could be compression molding an EPDM membrane disc 10, 60, in a mold (not shown) and then subjecting the mold and the EPDM membrane disc 10, 60, to an appropriate temperature and pressure, and then removing the molded EPDM membrane disc 10, 60, from the mold, and forming a molded EPDM membrane disc or an intermediate article. The molded EPDM membrane disc would then be cooled to a room temperature and then perforated with holes or openings or slits 14, to form a perforated EPDM membrane disc. The next step would be to fluorinate the perforated EPDM membrane disc so that all exposed surfaces are covered with at least one layer of a fluorinated material 12, 22, 62.

Another method of forming the gas diffuser membrane 43, 53, of this invention would be to compression mold an EPDM membrane tube 40, and subject it to an appropriate pressure and temperature to form a compression molded EPDM membrane tube. In this method one would use a mold process or an extruder process. The compression molded EPDM membrane tube would then be removed from the mold or the extruder and cooled to a room temperature. The compression molded EPDM membrane tube would then be perforated with holes or openings or slits 44. The compression molded EPDM perforated membrane tube would then be fluorinated so that all exposed surfaces are covered with at least one layer of a fluorinated material 42, 52.

Yet another method could be to compression mold an EPDM membrane tube 40, and then subject it to an appropriate pressure and temperature for an appropriate during depending upon the thickness of the EPDM membrane layer 40. After the heating process the compressed EPDM membrane tube is removed from the mold or extruder and cooled to desired temperature, such as, for example, room temperature. The compressed EPDM membrane tube would then be perforated to form a plurality of slits or openings or holes 44. The compressed EPDM perforated membrane tube would then be fluorinated so that all exposed surfaces are covered with at least one layer of a fluorinated material 42, 52.

For some applications it may be desired that the perforated EPDM membrane disc or the EPDM perforated membrane tube or the compressed EPDM perforated membrane tube after the fluorination process is then coated with at least one layer of a PTFE coating or layer (not shown).

It should be appreciated that with this invention inner sidewalls of the slits 14, 44, are also coated with at least one fluorinated layer 22, 52, during the fluorination process and thus inner slit fouling is prevented.

The material for the fluorination process can be selected from a group consisting of for example, Xenon DiFluoride, Fluorine gas, Pentafluoride liquid, to name a few.

For most applications it is preferred that the EPDM membrane disc or EPDM membrane tube is processed in the mold or the extruder at a temperature of between about 100 C to about 250 C, and preferably between about 150 C to about 250 C.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for forming a gas diffuser membrane, the method comprising the steps of:
    (a) forming a membrane, the membrane comprising an ethylene-propylene-diene monomer rubber material;
    (b) perforating the membrane to form a plurality of perforations therein; and
    (c) incorporating fluorine into at least a portion of the membrane by exposing the membrane to a gas comprising fluorine.

2. The method of claim 1, wherein each of the plurality of perforations has a respective diameter between about 0.1 millimeters and about 8.0 millimeters.

3. The method of claim 1, wherein the gas diffuser membrane comprises a fine bubble diffuser membrane or a coarse bubble diffuser membrane.

4. The method of claim 1, wherein each of the plurality of perforations comprises a respective one of a plurality of perforation sidewalls, and the plurality of perforation sidewalls is exposed to the gas comprising fluorine.

5. The method of claim 1, wherein the membrane comprises a flat surface, a tubular surface, a curved surface, a polygonal-shaped surface, a disc-shaped surface, a sock-shaped surface, or a combination thereof.

6. The method of claim 1, wherein the membrane has two opposing surfaces and both surfaces are exposed to the gas comprising fluorine.

7. The method of claim 1, further comprising the step of depositing a layer on the membrane, the layer comprising polytetrafluoroethylene.

* * * * *